(12) United States Patent
Tamamura (10) Patent No.: US 6,546,636 B2
(45) Date of Patent: Apr. 15, 2003

(54) METHOD OF PRODUCING A PRECISE HORIZONTAL OR VERTICAL LASER LINE BEAM DRAWN ON OBJECTIVES, AND APPARATUS THEREOF

(75) Inventor: Akihito Tamamura, Sabae (JP)

(73) Assignee: Kabaushiki Kaisha Audio-Technica, Tokyo (JP)

( * ) Notice: Subject to any disclaimer, the term of this patent is extended or adjusted under 35 U.S.C. 154(b) by 0 days.

(21) Appl. No.: 10/047,694

(22) Filed: Jan. 15, 2002

(65) Prior Publication Data

US 2002/0178595 A1 Dec. 5, 2002

(30) Foreign Application Priority Data

Jun. 1, 2001 (JP) .......................... 2001-166331

(51) Int. Cl.[7] .................... G01C 15/00; G01C 5/00
(52) U.S. Cl. .................... 33/286; 33/291; 33/DIG. 21; 359/641
(58) Field of Search ................ 33/281, 282, 283, 33/284, 285, 286, 290, 291, 391, 397, 451, DIG. 21; 356/138; 372/101; 359/641

(56) References Cited

U.S. PATENT DOCUMENTS

| | | | | |
|---|---|---|---|---|
| 4,106,207 A | * | 8/1978 | Boyett et al. ................ 33/286 |
| 4,896,169 A | * | 1/1990 | Kuwabara et al. ........... 347/237 |
| 5,373,362 A | * | 12/1994 | Kano et al. ................. 356/606 |
| 5,402,230 A | * | 3/1995 | Tian et al. .................. 356/482 |
| 5,459,932 A | * | 10/1995 | Rando et al. ................. 33/291 |
| 5,577,140 A | * | 11/1996 | Endo et al. .................. 359/332 |
| 5,782,003 A | * | 7/1998 | Bozzo ......................... 33/291 |
| 6,009,630 A | | 1/2000 | Rando |
| 6,043,879 A | * | 3/2000 | Dong .......................... 33/291 |
| 6,256,895 B1 | | 7/2001 | Akers |
| 6,326,636 B1 | * | 12/2001 | Isoda et al. .................. 250/586 |
| 6,459,494 B1 | * | 10/2002 | Kurokawa et al. ........... 356/637 |

* cited by examiner

Primary Examiner—Diego Gutierrez
Assistant Examiner—Yaritza Guadalupe
(74) Attorney, Agent, or Firm—Welsh & Katz, Ltd.

(57) ABSTRACT

The improved laser line beam emitting apparatus provides reduction in the cost and a number of the parts, simplicity of the adjustment, and allows for drawing of a straight line in the range of the wide angle. It comprises a single laser beam source unit in which a cylindrical rod lens with semitransparent and complete transparent faces produces reflectively and refractively passing laser beam therefrom. The reflected and refracted laser beams diffuse in the first direction and the second direction opposite from the first direction, respectively. The diffused laser beams draw a horizontal or vertical laser line surrounding the apparatus (a straight line passing objectives ahead of, behind and opposite sides of the apparatus or passing objectives above and below the apparatus).

17 Claims, 6 Drawing Sheets

METHOD OF PRODUCING A PRECISE HORIZONTAL OR VERTICAL LASER LINE BEAM DRAWN ON OBJECTIVES, AND APPARATUS THEREOF

FIELD OF THE INVENTION

The present invention relates to a laser marking apparatus with the emission of laser beam(s) or ray(s) (hereinafter, laser beam) to an objective, and particularly to a laser line beam emitting apparatus, which is directed to a laser marking instrument for the construction industry for measurement of objectives such as walls, ceilings, floor, and etc. of a building under construction, with the emitted beams.

BACKGROUND OF THE INVENTION

Nowadays, the construction industry uses the laser line emitting apparatus in place of the marking (or ink pad) technique, which carpenters or construction workers measure the objectives by drawing a vertical or horizontal line on respective surfaces with a Chinese ink or chalk.

The apparatus produces a laser line beam (a drawn line) by collimating diffusive semiconductor laser beam through a collimator lens therein, and then generating unidirectional diffusion of the collimated laser beam through a cylinder-shaped rod lens therein. In addition, it performs the horizontal or vertical preservation (a plumb or horizontal line) of the laser line beam by the gimbals mechanism. The gimbals mechanism allows for constantly positioning of a laser beam source unit having united hold of the semiconductor laser, and collimator and rod lenses through its holder. In the gimbals mechanism, its pendulum maintains the constant position of the laser beam source unit disposed therein such that even though the laser line beam emitting apparatus inclines downward or upward, it provides the horizontal or plumb laser line beam.

Figure 9:
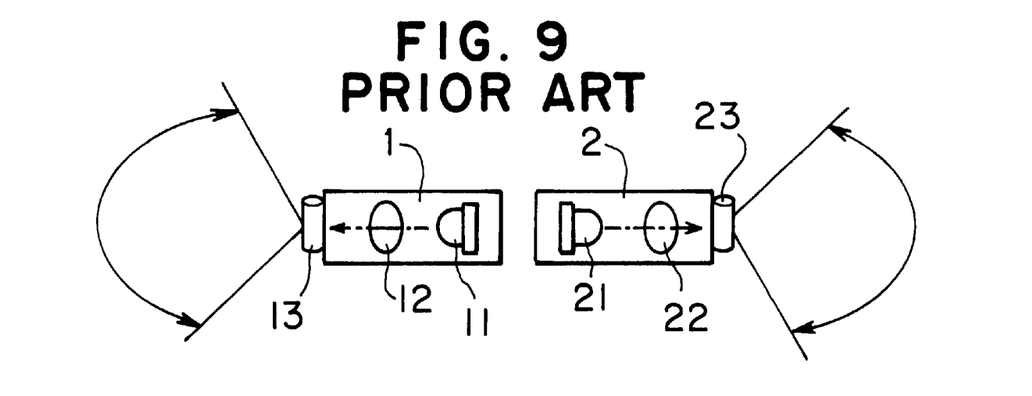
FIG. 9 is a general perspective view of showing an embodiment of a laser beam source unit in the conventional laser line beam emitting apparatus.
Figure 10:
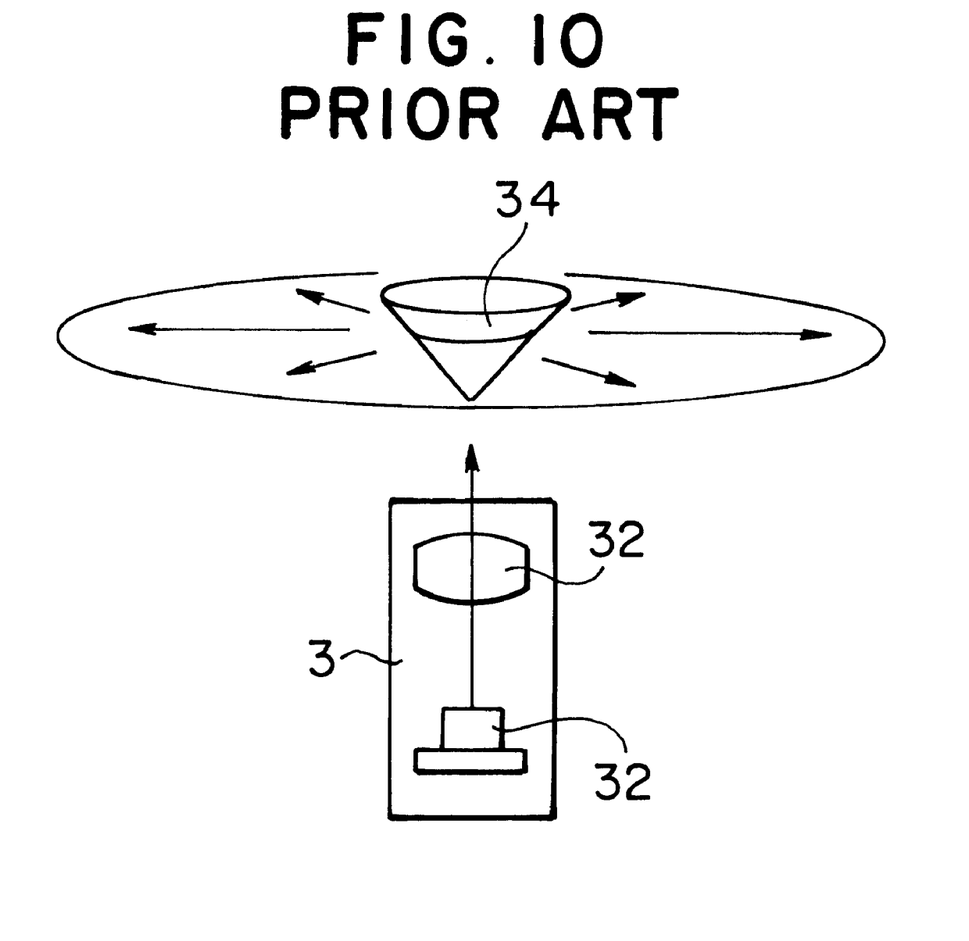
FIG. 10 is a general perspective view of showing another embodiment of a laser beam source unit in the conventional laser line beam emitting apparatus.

The construction industry desires possibility of a produced straight line, which is drawn without disconnection to the wide angle that is within an area extending from, for example, one wall to a ceiling, the other wall, and floor, or a produced horizontal line, which is drawn to the wide angle that it is within an area extending between surrounding three or four walls, in the building under construction. FIGS. 9 or 10 shows examples of the laser line beam emitting apparatus as designed or proposed in accordance with the desire.

FIG. 9 shows, as a conventional example, a laser line emitting beam apparatus with a pair of laser source units 1 and 2. The laser source units 1 and 2 have collimator lenses 12 and 22, and rod lenses 13 and 23, which are held by their holders, respectively. The paired laser source units 1 and 2 are disposed such that respective optical axes have a horizontal arrangement with respective proximal ends opposing to each other. Each of the rod lenses 13 and 23 is disposed perpendicularly with respect to the horizontal optical axis. Thus, the laser beam from respective laser source units 1 and 2 widthwise spreads to each rightward and leftward 90 degrees (360 degrees around the whole apparatus) so that the apparatus provides drawing of a straight horizontal line drawn between objectives ahead of, behind, and opposite sides thereof. It is obvious that rotation through 90 degrees of the laser source units 1 and 2 also allows a drawn vertical line with respect to the horizontal, the vertical line extending between objectives above, below, and opposite sides of the horizontal apparatus.

FIG. 10 shows, as another conventional example, a laser line beam emitting apparatus having a laser beam source unit 3 with a semiconductor laser 31 and a collimator lens 32, and a conical mirror 34. According to the apparatus, the direction of the laser beam emitted from the semiconductor laser 31 is from down to up. The emitted laser beam from the semiconductor laser 31, which becomes parallel flux through the collimator lens, goes toward the conical mirror such that the centered flux reaches the vertex of the conical mirror 34. Hence, the laser flux is reflected from the reflective conical mirror face in the radial direction to 360 degrees angle area. In FIG. 10, it is obvious that the vertically directing of the central axes of the conical mirror 34 allows for drawing of a horizontal line on the objectives, while the horizontally directing of the central axes of the conical mirror 34 (the direction of the laser beam is sideward) allows for drawing of a vertical line on objectives.

The conventional apparatus as shown in FIG. 9 has a problem of that it is expensive because of its requirement of installations of its two laser beam source units. In addition, it requires individual adjustments of angles and further positions of rod lenses of respective laser beam source unit, for provision of a straight line, which will be drawn on objectives therearound. Such the complex adjustment also has a problem of that it adds the expensive cost to the apparatus.

Furthermore, the conventional apparatus as shown in FIG. 10 also has a problem of which it is expensive because of that high precise production of the conical mirror is difficult and the conical mirror requires reflective material being deposited on the conical surface. In addition, the adjustment of coaxial position of the laser flux center and, conical mirror vertex has great difficulty.

SUMMARY OF THE INVENTION

The present invention provides solution to the foregoing problem of the prior arts. The present invention is directed to provide a method for emitting a precise laser line beam and an apparatus thereof, which is directed to a laser marking instrument which allows for precisely drawing of a horizontal or vertical line to the wide angle area therefrom just to 360 degrees, in spite of a simplified structure thereof as well as reduction in the parts and easier adjustment thereof.

The present invention provides a laser line beam emitting apparatus, which uses a single laser beam source unit. This contributes to decrease in the number of the parts. The laser beam source unit according to the present invention comprises a laser beam source, a collimator lens, and a cylindrical rod lens. The cylindrical rod lens comprises a complete transparent area, and a semitransparent area in part provided thereon as opposed to a laser beam emitted from the laser beam source.

The semitransparent area of the rod lens has the reflection and diffusion of the collimated, emitted laser beam in a first direction, while the complete transparent area has the refraction and diffusion of the rest beam passing thorough the semitransparent area in a second direction.

The desired location of the semitransparent area is at 140 or less degrees angle with respect to the center axis of the rod lens. Because the semitransparent area at over 140 degrees angle causes diffusion of the laser beam by 280 degrees angle with respect to the center axis of the rod lens. Accordingly, this causes overlapping problem of the reflected and refracted beams.

The rod lens may be arranged to vertically or horizontally cross the optical axis of the collimated, emitted laser beam. The vertical arrangement of the rod lens with respect to the optical axis provides emission of the laser line beam to objective ahead of, behind, and opposite sides of the laser line beam emitting apparatus, while the horizontal arrangement of the rod lens with respect to the optical axis provides emission of the laser line beam to objective above, below, and opposite sides of (or ahead of, and behind) the laser beam emitting apparatus.

The laser line beam source unit further comprises a holder for hold of the laser beam source, the collimator lens, and the rod lens. The laser beam source is attached at the trailing end of the holder, and the holder has a cylindrical mirror attached at the approximate medium portion on the side of the leading end thereof. The collimator lens is disposed in the interior cylindrical mirror, and the rod lens is attached at the distal end of the cylindrical mirror.

The cylindrical mirror for lens and the holder of the laser line beam source unit have pairs of opposite slits through which the diffused laser beam from the rod lens may passes, respectively.

The location of the rod lens with respect to the laser line beam is easier than the prior arts. The cylindrical mirror shows disposition relationship between the rod lens and the laser beam for adjustment of location therebetween. In addition, the pairs of slits of the cylindrical mirror for lens and the holder also provide a performance of correct location of the cylindrical mirror to the holder.

In the laser line beam emitting apparatus according to the present invention, the laser line beam source unit is assembled into a pendulum, which is hung from a gimbals mechanism. The pendulum provides possible swing of the laser line beam source unit between the front and the back, and the right and the left.

The gimbals mechanism comprises respective four shafts and three links linked in series through the four shafts. The four shafts comprises the first pair of shafts horizontally extending from a housing surface of the laser line beam emitting apparatus, and the pair of second shafts which is at right angles to the first paired shafts. The first link has free swings about the first shaft on the side of the trailing end thereof, and linkage to the second link through the second shaft on the side of the leading end thereof. The second link has free swings about the second shaft on the side of the trailing end thereof and the leading end of the first link, and linkage to the third link thorough the third shaft on the side of the leading end thereof. The third link has free swings about the third shaft on the side of the trailing end thereof, and linkage to the pendulum through the fourth shaft on the side of the leading end thereof. Hence, the pendulum may freely swing.

The pendulum may have a conductive plate attached to its lower portion. The conductive plate laterally extends from the lower pendulum portion. The extending conductive plate is sandwiched between a pair of magnets, which are fixed on inner surfaces of respective horizontal plates of an inverted C shape yoke. Each of the magnets is spaced apart from the conductive plate. The conductive plate, inverted C shape yoke, and pairs of magnets together makes up the construction of a brake device for pendulum. Movements of the conductive plate through the swinging pendulum causes generation of eddycurrent between the conductive plate and the pair of magnets to brake the pendulum.

Thus, the single laser beam source unit according to the present invention allows for reduction in cost of the laser line beam emitting apparatus. The laser beam source, collimator lens, and rod lens, which are assembled into the pendulum through the laser beam source unit, provides the constructional simplicity. The single laser beam source unit provides easy formation of a straight line horizontally or vertically surrounding the laser line beam emitting apparatus or passing objectives ahead, behind, and opposite sides, or above, below, and opposite sides (or ahead or behind) thereof. The cylindrical mirror provides easy adjustment in location of the rod lens with respect to the laser beam. In addition, the conductive plate at the lower portion of the pendulum, the inverted C-shape yoke, and the pairs of magnets on respective horizontal plates of the yoke make up the construction of a brake device that it brakes the pendulum swinging.

PREFERRED EMBODIMENT OF THE INVENTION

Following descriptions are directed to embodiments of a method of emitting a laser line beam, and a laser line beam emitting apparatus according to the instant invention, with reference to their drawings.

Figure 1:
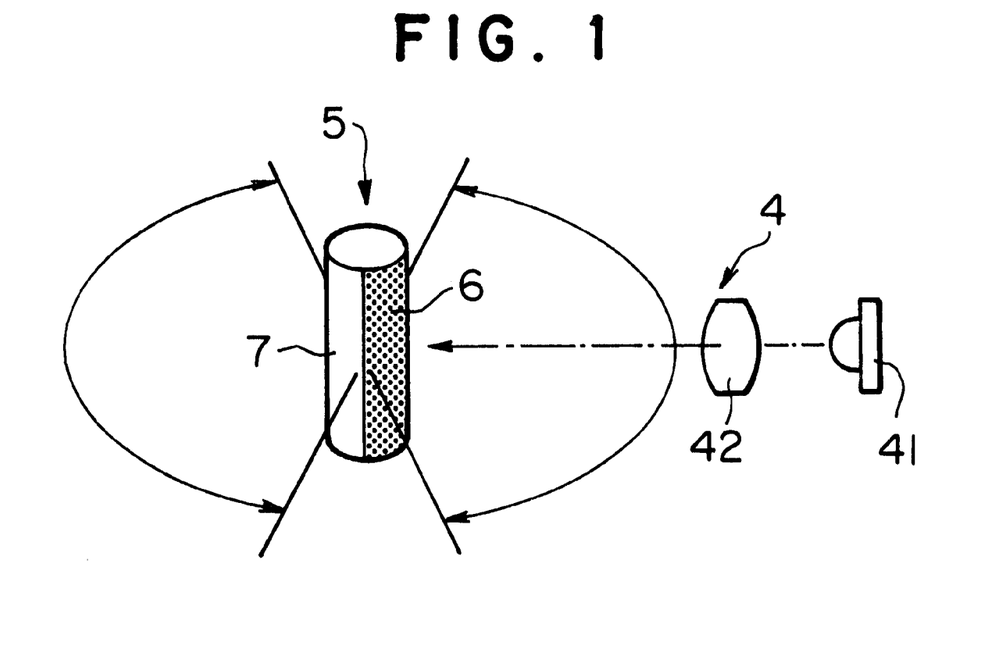
FIG. 1 is a perspective view of showing an embodiment of a laser source unit as applied for the present invention.
Figure 2:
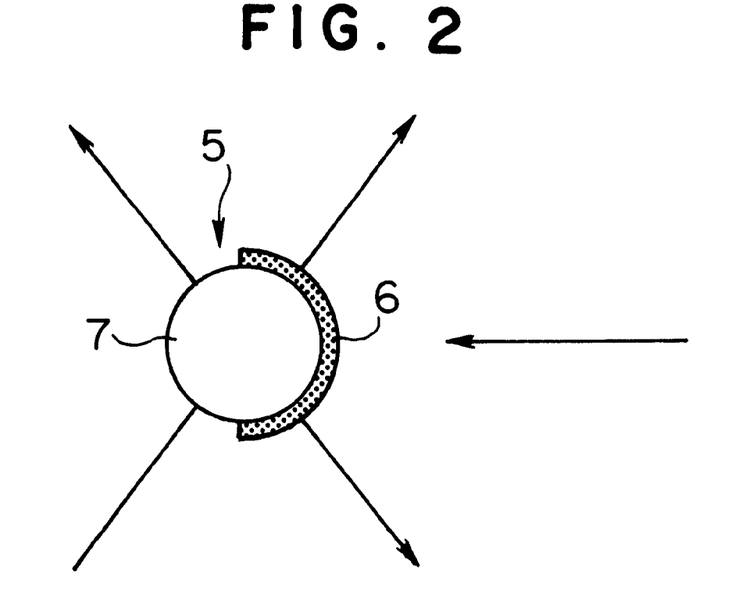
FIG. 2 is a enlarged plain view of a rod lens in the laser beam source unit.

FIGS. 1 and 2 show a rod lens having a construction in which the present invention is characterized. According to the drawings, a rod lens 5 is a cylindrical lens, which is same in the whole lengthwise diameter. The approximate semicircle face of the rod lens forms a semitransparent face 6, and the rest forms a complete transparent face 7. The formation of the semitransparent face 6 is a process for coating a semitransparent membrane or film. The semitransparent face 6 has 1 to 1 reflectance to transmissivity ratio. It has reflection and transmission of incident beam to approximately 50%.

As shown in FIG. 1, a light source unit 4 comprises the rod lens 5, a laser generator 41 such as semiconductor laser, and a collimator lens 42. The emitted laser beam from the laser generator 41 becomes approximate parallel flux through the collimator lens 42, and goes toward the semitransparent face 6 of the rod lens 5. The parallel flux comes to the semitransparent face 6 of the rod lens 5 with movement perpendicular with respect to the central axis of the rod lens and incidence on the approximate center of the semitransparent face 6.

When the laser beam reaches the semitransparent face 6, the approximate half of the laser beam is reflected from the semitransparent face 6. The incident laser flux are radially reflected with diffusion only in the perpendicular direction with respect to the central axis of the rod lens 5 to an angle range of 180 degrees so that a single laser line beam is drawn on the objects behind and on opposite sides or on one side and ahead of and behind the laser line beam emitting apparatus. The approximate rest half of the laser beam energy pass, after reaching the semitransparent face 6, through the semitransparent face 6 and the interior of the rod lens 5, and comes out of the complete transparent face 7. In addition, the transmitted, refracted laser flux from the rod lens 5 diffuses only in the perpendicular direction with respect to the central axis of the rod lens 5 in the angular range of 180 degrees so that a single laser line beam is drawn on the objects ahead of and opposite sides or on another side of and ahead of and behind the apparatus.

Thus, the approximate half of the emitted laser beam is radially reflected and defused from the semitransparent face 6 of the rod lens 5, while the rest is radially refracted and defused from the complete transparent face 7. The rod lens 5 acts to diffuse the reflected laser beam within the limit of the angle such that bidirectional (rightward and leftward) expansion limit of the diffused, refracted laser beam encounters with one of the diffused, reflected laser beam on the same horizontal or vertical line. This allows for forming of a straight horizontal laser line passing some objects around (ahead of, behind and opposite sides of) the apparatus. In FIG. 1, since the rod lens 5 is provided in the vertical arrangement, it provides formation of a horizontal laser line going once round the apparatus. However, it will be understood that if the rod lens 5 is provided in the horizontal arrangement, it allows for forming of a vertical laser line going once round the apparatus or passing objects above, below, and opposite sides (or ahead of and behind) the apparatus.

Figure 8:
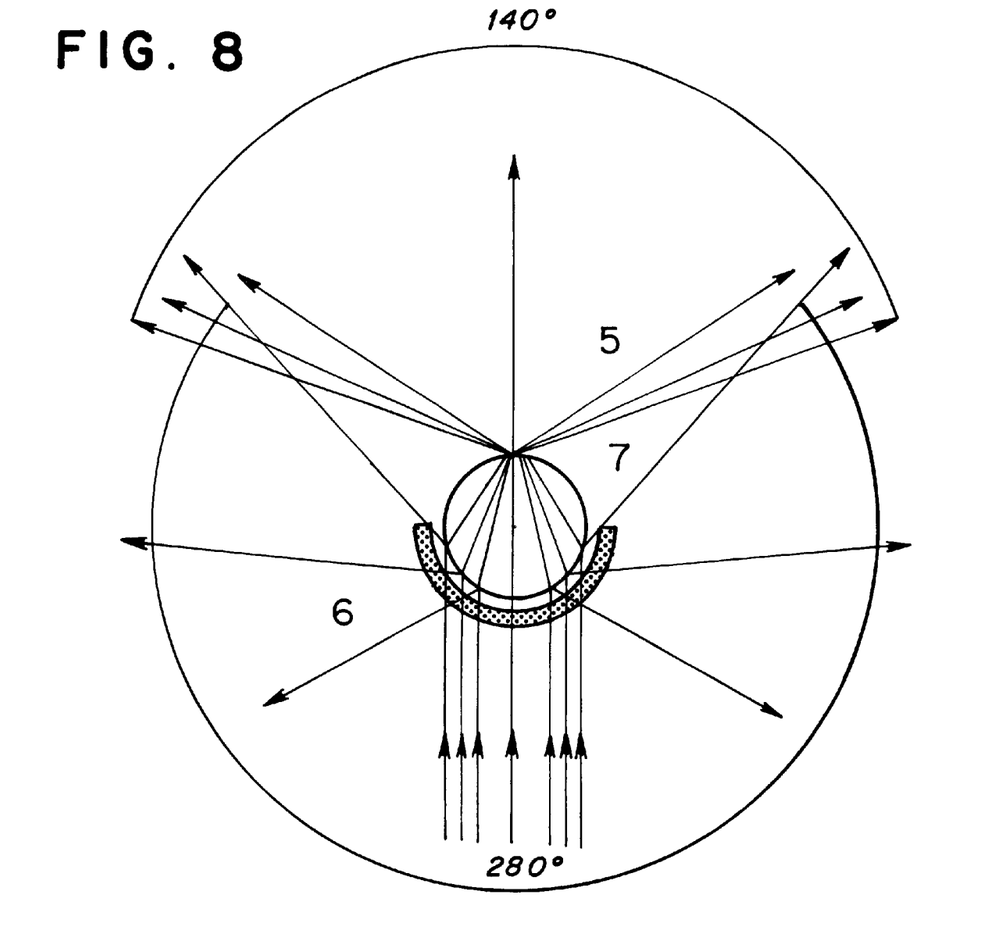
FIG. 8 is a plain view of showing embodiment of the rod lens, which is used for the present invention, and depicting the range of the angles at which the laser beam is reflected and passes and refracted.

The semitransparent face 6 of the rod lens 5 has unidirectional reflective action to the laser beam emitted from the semiconductor laser. However, as described previously in the background of the invention, the emitted laser beam from the semiconductor laser gets collimated flux beam through the collimator lens. Hence, as shown in FIG. 8, when the collimated flux laser beam is transmitted to a rod lens having a semitransparent face formed on the external surface thereof within the range of 180 degrees angle with respect to the central axis, it is radially reflected from the semitransparent face within the range of 280 degrees angle with respect to the central axis. This causes a problem of which the radially diffused, reflected laser beam line overlaps in part, with the radially diffused, refracted laser beam line.

The elimination of the overlapping problem is to obtain the desired range of angle in formation of the semitransparent face such that the transmitted laser beam is reflected from the semitransparent face within the range of 180 degrees angle with respect to the central axis of the rod lens 5. With 180 degrees angle reflection laser beam, 140 degrees angle in formation of the semitransparent face meets.

In most cases, when the semitransparent face is formed on the rod lens 5 within the range of 140 degrees, the refracted laser beam from the complete transparent face is diffused within the range of approximately 180 degrees angle. Thus, within the range of approximately 140 degrees angle, the combined, reflected and refracted laser beam allows for forming of a horizontal or vertical laser beam line to the range of 360 degrees angle without the overlapping.

Figure 3A:
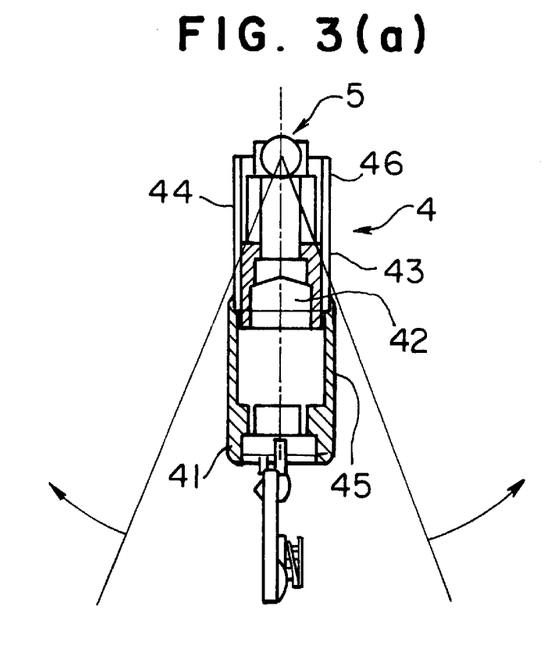
FIGS. 3A, 3B and 3C are sectional front, front, and side views of showing an embodiment of combined laser beam source unit and holder, which may be applied to the present invention, respectively.
Figure 3B:
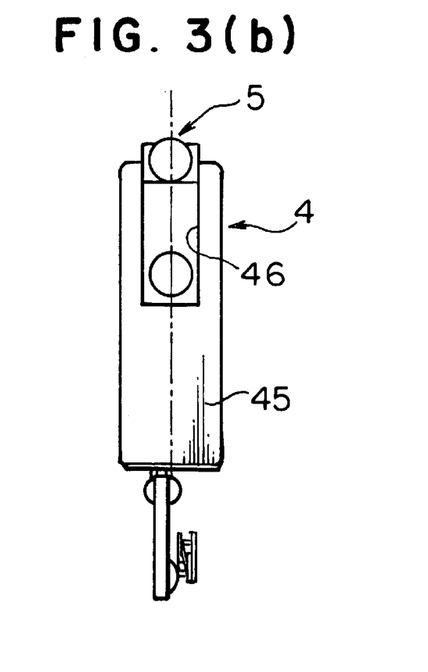
Figure 3C:
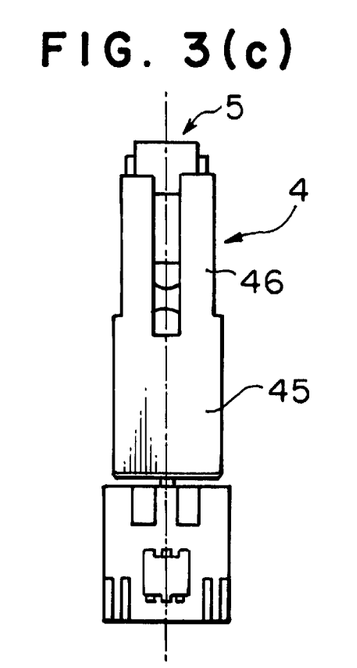

Referring to FIGS. 3A, 3B, and 3C, assembly of the rod lens with the semitransparent face into a laser line beam emitting apparatus are shown. A cylindrical inner mirror for lens 43 is mounted from the intermediate portion to the leading end of the holder 45, and a collimator lens 42 is disposed within the cylindrical inner mirror 43. A semiconductor laser 41 as a laser source is mounted to the holder 45 at the trailing face end thereof. The rod lens 5 is attached at the medium portion of the holder 45 on the side of leading end thereof by, for example, adhesive, such that the semitransparent face 6 is directed to the mirror inside of the cylinder 43 on the side of the leading end thereof.

From the foregoing, the collimator lens 42 of the holder 45 provides to collimate the diffused, emitted laser beam from the semiconductor laser 41, and the semitransparent face 6 of the rod lens 5 acts to generate the reflected laser beam in one direction therefrom, while the transparent face acts to generate the refracted, transmitted laser beam in the other direction. As shown in FIG. 3A, the reflected beam to the approximate 180 degrees angle is in part interrupted by components such as the collimator lens 42 and the semiconductor laser 41. However, the rest beam passes out through pairs of slits 44, 46 provided for the purposes on respective cylindrical mirror for lens 43 and holder 45 in symmetrical relation to the centerline or axis thereof.

Figure 4:
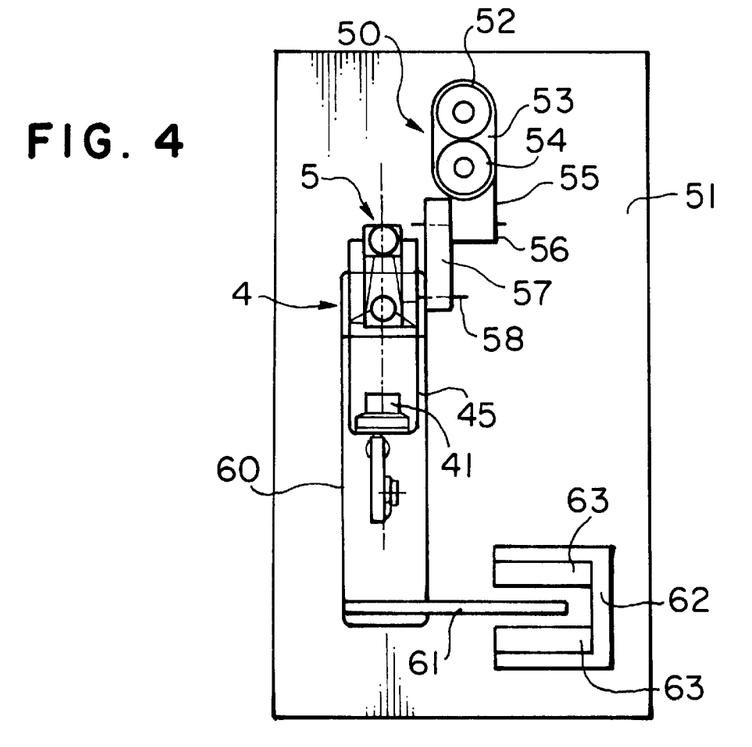
FIG. 4 is a front view of showing of an embodiment according to the present invention, in which the holder is provided.

Referring to FIG. 4, the holder 45 mounting the semiconductor laser 41, collimator lens 42, cylindrical mirror for lens 43, and rod lens 5 is assembled into a pendulum 60. The pendulum 60 is hung from a gimbals mechanism 50. The gimbals mechanism 50 comprises a first shaft 52 disposed on a lateral body 51 of the laser line beam emitting apparatus with respect thereto; a first link 53 fitted on and hung from the shaft 52 which is on the side of its proximal end, such that it has free swings about the shaft 52; a second link 55 linked to the first link 53 through a second shaft 54 which is on the side of the proximal end thereof and provided in the parallel arrangement with the shaft 52 such that it has free swings about the shaft 54; a third link 57 linked to and hung from the second link 55 through a third shaft 56 which is on the side of its proximal end and at right angles to the shafts 52, 54 such that it has free swings about the shaft 56; and a fourth shaft 58 which is provided in the parallel arrangement with the shaft 56 such that it gives free swings to the pendulum 60 on the side of the distal third link 56. The pendulum 60, which is hung from the foregoing constructional gimbals mechanism, can keep its balance in a fixed directional relation, for example, vertical direction with respect to the body 51 of the laser line beam emitting apparatus.

According to an embodiment as shown in FIG. 4, the disposed direction of the light source unit 4 with assembly of the semiconductor laser 41, the collimator lens 42, and the rod lens 5 to the holder 45 and the cylindrical mirror for lens is from down to up in a manner such that the rod lens 5 comes to a predetermined location of the trailing pendulum end 60, and provided in the horizontal arrangement, when the pendulum 60 has maintained its balance. Therefore, the reflected laser beam from the semitransparent face of the rod lens 5 and the refracted laser beam from the complete transparent face, which are combined together, produce a vertical laser line beam that is emitted to the objectives which are above, below, and opposite sides of (or ahead of or behind) the apparatus.

As shown in FIG. 4, the pendulum 60 has a conductive plate 61 mounted to and horizontally protruding from the leading portion thereof. The conductive plate 61, an inverted C shape-yoke 62, and a pair of magnets 63 fixed on respective pieces of the C shape-yoke 62, which are above and below the conductive plate 61, together makes up the construction of a brake device for pendulum. Sandwiched between the pair of spaced magnets 63, 63 is the conductive plate 61 which has swings caused by the swung pendulum 60 to generate eddycurrent. The produced eddycurrent loss produces brake applied to the pendulum 60.

Figure 5:
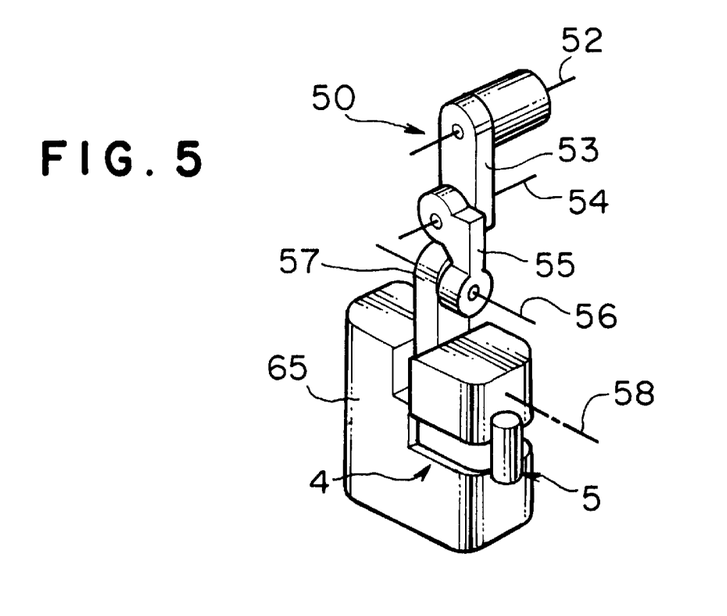
FIG. 5 is an external perspective view of showing another embodiment according to the present invention.

The mounted rod lens 5 (as shown in FIG. 4) is arranged along the horizontal axis, but may be arranged along the vertical axis, as shown in FIG. 5. In FIG. 5, the reference 65 indicates a pendulum. The pendulum 65 is hung from a gimbals mechanism having the same construction as one as shown in FIG. 4. Accordingly, the same components bear the same references, respectively, and the descriptions are omitted. Mounted to the pendulum 65 is a laser beam source unit 4 which is arranged along the vertical axis. During the time when the pendulum 60 maintains its fixed balance, the central axis of the rod lens 5 stands vertical. Therefore, according to the embodiment as shown in FIG. 5, the reflected laser beam from the semitransparent face of the rod lens 5, and the refracted, transmitted laser beam from the complete transparent face through the semitransparent face, which are combined together, produces a horizontal laser line beam being emitted to the objects.

For the accurate drawing of the emitted vertical or horizontal line on the objectives, the gimbals mechanism with the kept balance of the pendulum having the laser beam source unit is required to have higher accurate position and orientation of the rod lens in the laser beam source unit with respect to the laser beam. Because of that the tilted rod lens has great influence on the laser line beam emitting apparatus in the performance, it is very important that the tilted rod lens should be corrected.

In the conventional laser line beam emitting apparatus, the position and orientation of the rod lens are performed by the adjustment mechanisms or processes which provides the adjustment by pushed screw(s) or thread(s) and reacting spring(s) against the pressure of the former, which are assembled into the laser beam source unit. Some of the adjustments also have securement of a holder for rod lens by screw(s) or thread(s), or adhesive. However, the conventional adjustments experiences great difficulty, for example, the complicated adjustment mechanism, and the screw(s) or thread(s) and spring residual stress which influences change with time thereto.

Figure 6:
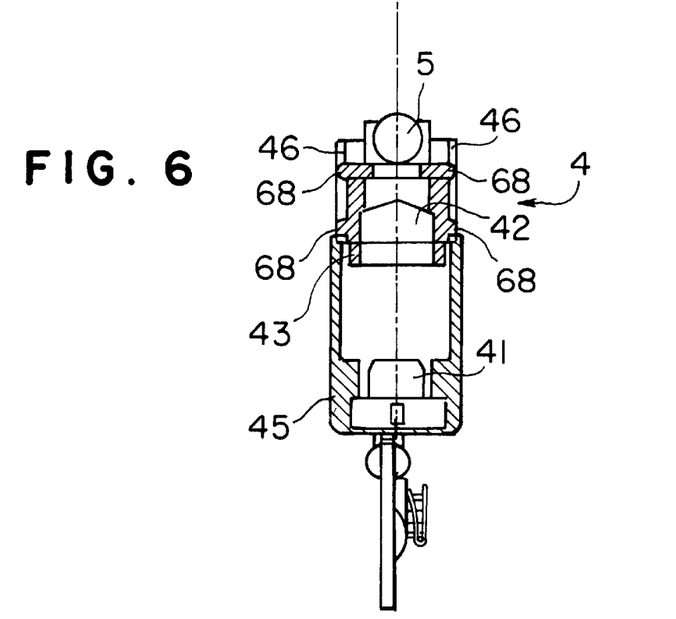
FIG. 6 is a sectional front view of showing an embodiment of an adjustment mechanism for rod lens, which may be applied to the present invention.
Figure 7:
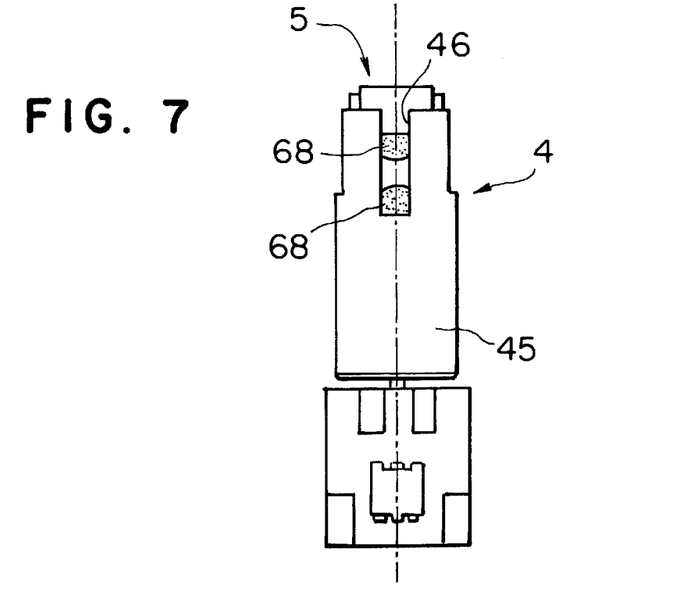
FIG. 7 is a side view of the adjustment mechanism for rod lens.

Provided, recommended herein is a mechanism and a process for adjustment of positioned and orientated rod lens as shown in FIGS. 6 and 7. A laser beam source unit 4 as shown in FIGS. 6 and 7 has the same construction as one as shown in FIG. 3. Accordingly, the same components bear the same references, respectively, and the descriptions are omitted. In FIGS. 6 and 7, a holder 45 with a cylindrical mirror for lens 43 which can be separated therefrom and has a collimator lens 42 held therein and a rod lens 5 held at the leading face end portion thereof by for example, adhesive process is fixed in or on a jig (not shown). The adjustment of the relative distance and angle formed between the cylindrical mirror 43 and the holder 45 is performed by budging the jig to the appropriate point in accordance with viewing or ascerainment of the laser beam which is shown on the mirror. After the adjustment, the cylindrical mirror 43 is fixed to the holder 45 by adhesive or soldering process.

According to the embodiment as shown in FIGS. 6 and 7, it provides adhesion or solder of two portions of the cylindrical mirror for lens 43 to the holder 45 at the pair of slits 46 formed thereon as described above. The reference 68 indicates the adhesion or solder portions. Preferably, for the solder process, the solder portions of the cylindrical mirror for lens 43 and holder 45 may be plated. After the performed adjustment and fixation between the cylindrical mirror 43 and the holder 45, the jig may be removed.

Therefore, the foregoing embodiment provides a very simple constructive adjustment mechanism or process, because of eliminated spring(s) and screw(s) or thread(s). This does not experience influence of the residual stress as caused by the sprig(s) and screw(s) or thread(s), and can provide reduction in variation of the position and orientation with time after the adjustment.

What is claimed is:

1. A method for emitting a laser line beam from a laser beam source unit of a laser line beam emitting apparatus to objectives comprising steps of emitting a laser beam from a laser beam source of said laser beam source unit to objectives to be emitted;

collimating the emitted laser beam through a collimator lens of said laser beam source unit; and producing reflection and diffusion of a part of the collimated, emitted laser beam from a semitransparent area provided on a rod lens of said laser beam source unit, in a first direction, while producing passage, refraction and diffusion of the rest of the collimated, emitted laser beam from a complete transparent area of said rod lens, in a second directions opposite to said first directions.

2. The method for emitting a laser line beam from a laser beam source unit of a laser line beam emitting apparatus as defined in claim 1, said method further comprising a step of producing a line, which is drawn by said diffused, reflected laser beam from said semitransparent area in the first direction and said diffused, refracted, passed laser from said complete transparent area in the second direction so as to approximately surround said apparatus.

3. The method for emitting a laser line beam from a laser beam source unit of a laser line beam emitting apparatus to objectives as defined in claim 2, wherein said drawn line is a straight line formed on said objectives, which are below, above, and sideways or ahead of and behind with respect to said apparatus or ahead of, behind, and sideways with respect to said apparatus.

4. A laser line beam emitting apparatus for emitting a laser line beam to objectives comprising a laser beam source unit for laser beam emission;

a laser beam source provided in said laser beam source unit to emit a laser beam therefrom;

a collimator lens provided in said laser beam source unit for collimating of the emitted laser beam;

a rod lens provided in said laser beam source unit, having a semitransparent area provided thereto for reflection and diffusion of a part of the collimated, emitted laser beam therefrom in first directions, and a complete transparent area for refraction and diffusion of the rest of the collimated, emitted laser beam therefrom in second directions opposite to said first directions.

5. The laser line beam emitting apparatus as defined in claim 4, said apparatus further comprising means for producing a line, which is drawn by said diffused, reflected laser beam from said semitransparent area in the first direction and said diffused, refracted, passed laser from said complete transparent area in the second direction so as to approximately surround said apparatus.

6. The laser line beam emitting apparatus as defined in claim 4, wherein said semitransparent area is at 140 or less degrees angle with respect to the center axis of the rod lens.

7. The laser line beam emitting apparatus as defined in claim 4, wherein said rod lens is arranged to vertically or horizontally cross the optical axis of the collimated, emitted laser beam.

8. The laser line beam emitting apparatus as defined in claim 4, wherein said laser beam source unit includes a cylinder in which said collimator lens is disposed and which has a region for attachment of said rod lens thereon; and
   a ring shaped holder to hold said laser beam source at the trailing end thereof, and said cylinder at the leading end thereof.

9. The laser line beam emitting apparatus as defined in claim 8, said cylinder and said holder of the laser line beam source unit have pairs of opposite slits through which the diffused laser beam from the rod lens may passes, respectively.

10. A laser line beam emitting apparatus for emitting a laser line beam to objectives comprising a housing;
    a laser beam source unit;
    a laser beam source provided to said laser beam source unit to emit a laser beam therefrom;
    a collimator lens provided in said laser beam source unit for collimating of the emitted laser beam;
    a rod lens provided to said laser beam source unit and having a semitransparent area provided thereto for reflection and diffusion of a part of the collimated, emitted laser beam therefrom in first directions, and a complete transparent area for refraction and diffusion of the rest of the collimated, emitted laser beam therefrom in second directions opposite to said first directions;
    gimbals mechanism provided in said housing; and
    a pendulum hung from said gimbals mechanism so as to allow for swinging of said laser beam source unit assembled thereinto.

11. The laser line beam emitting apparatus as defined in claim 10, said apparatus further comprising means for producing a line, which is drawn by said diffused, reflected laser beam from said semitransparent area in the first direction and said diffused, refracted, passed laser from said complete transparent area in the second direction so as to approximately surround said apparatus.

12. The laser line beam emitting apparatus as defined in claim 10, wherein said semitransparent area is at 140 or less degrees angle with respect to the center axis of the rod lens.

13. The laser line beam emitting apparatus as defined in claim 10, wherein said rod lens is arranged to vertically or horizontally cross the optical axis of the collimated, emitted laser beam.

14. The laser line beam emitting apparatus as defined in claim 10, wherein said laser beam source unit includes an inner cylindrical mirror in which said collimator lens is disposed and which has a region for attachment of said rod lens at its distal end; and
    a ring shaped holder to hold said laser beam source on the side of the trailing end thereof, and said inner cylindrical mirror on the opposite side thereof from said laser beam souse.

15. The laser line beam emitting apparatus as defined in claim 14, wherein the inner cylindrical mirror and the holder of the laser line beam source unit have pairs of opposite slits through which the diffused laser beam from the rod lens may passes, respectively.

16. The laser line beam emitting apparatus as defined in claim 14, wherein said inner cylindrical mirror shows location relationship between said rod lens and the laser beam, when said rod lens is assembled into said laser beam source unit.

17. The laser line beam emitting apparatus as defined in claim 10, said apparatus further comprising a brake device for electromagnetically braking swing of said pendulum.

* * * * *